UNITED STATES PATENT OFFICE.

WERNER MOOSER-SCHIESS, OF BERN-LIEBEFELD, SWITZERLAND.

PLASTIC MASS.

1,367,886. Specification of Letters Patent. Patented Feb. 8, 1921.

No Drawing. Application filed January 30, 1919, Serial No. 274,132. Renewed December 27, 1920. Serial No. 433,428.

*To all whom it may concern:*

Be it known that I, WERNER MOOSER-SCHIESS, doctor of philosophy, chemist, a citizen of Switzerland, residing at Bern-Liebefeld, Switzerland, have invented a new and useful Improvement in Plastic Masses; and I do hereby declare the following to be a full, clear, and exact description of the same.

The present invention relates to a new plastic mass and the process for making the same.

The new plastic mass consists of yeast and the esters of the organic acids with polyvalent alcohols.

I can use any sort of yeast, especially yeast produced under nutrition with ammonium salts, beer yeast, pressed yeast, dry and wet yeast.

I may use the esters of monovalent or polyvalent acids, as aliphatic, as aromatic or heterocyclic.

As suitable esters I have found among others: glycerin aceticester, glycerin butyric ester, glycerin formic ester, glycerin phthalic ester, glycerin esters of acids of the camphan group. I may also use esters of polyvalent alcohols which contain besides the alcohol groups other groups, for instance acetylated starch, acetylated sugar, acetylated cellulose.

The process for making the new masses consists in mixing yeast with the esters, suitably, in heating the mixture. I may also add suitable organic solvents for the esters, especially solvents of low boiling point, *i. e.* below 100 degrees centigrade. It is suitable to make the mixture while being heated under diminished pressure. The esters are agitated with the yeast, while a mass of the desired plastic properties is formed. One may knead and mix the components under diminished pressure and roll the mass. Finally one may subject the masses to a high pressure, for instance a hydraulic pressure.

In order to influence the hardness or elasticity one may add filling materials or substances which make plastic masses flexible. Such additions are for instance; cellulose, resins, kieselguhr, mica, soap. According to the nature and proportion of the said addition one may produce gum like or horny masses.

To carry out the present process one may liquefy the yeast, for instance, by heating, a step which may however be omitted.

Especially suitable for making the plastic masses is wet yeast, the alcohol of which is very useful. One mixes wet yeast, preferably under addition of cellulose derivatives, as acetylated cellulose, nitrocellulose especially collodion wool, with the esters under diminished pressure below 100 degrees centigrade and agitates the mixture under pressure.

Dry yeast is heated with glycerin at temperatures at which glycerin but not the yeast or the plastic masses are decomposed. One may add the esters to the glycerin, but also after the yeast has been treated alone with glycerin. The mixture of the yeast and the glycerin or its decomposition products and the esters are in the hot state kneaded under diminished pressure. If the esters have not been added, one adds them during the kneading operation.

Instead of glycerin one may mix yeast with other nonvolatile solvents or wetting liquids, as vegetable, animal or mineral oils.

During or after the action of the esters one may add substances which harden yeast, for instance formaldehyde, its polymers, as paraformaldehyde, trioxymethylen, or substances splitting off formaldehyde, as for instance hexamethylenetetramin.

One employs suitable yeast, the bitter tasting substances of which had not been extracted, because the resin of bitter yeast assists the process.

*Examples.*

For making a suitable plastic mass one may mix 1000 grams dry yeast, 100 grams tributyrin, 40 grams filling materials, as for instance chalk. Another suitable, plastic mass consists of 1000 grams wet yeast, 200 gr. triacetin and 500 grams glycerin.

One may use different esters of polyvalent alcohols in mixture with each other. A hard gum like mass is obtained with 50 grams triacetin, 10–40 grams dry yeast, 100 grams acetylated cellulose.

One may use 1000 grams dry yeast, 100 grams shellac glycerin ester, 40 grams chalk.

A suitable manner for making the masses is to add the esters, as triacetin, chlorhydrin, etc., to liquefied yeast, agitate and knead or roll the mass and heat with a hardening agent. In order to influence the mechanical properties one adds successively to the mixture of yeast and esters, resin, camphor, etc., especially a solution of camphor in acetone. The mixture may be effected under diminished pressure.

The filling materials are suitably added when the foaming in vessels under diminished pressure begins to diminish.

I claim:

1. Plastic masses containing yeast and esters of the organic acids with polyvalent alcohols.

2. Plastic masses containing yeast and esters of the monovalent acids with glycerin.

3. Plastic masses containing yeast, esters of the organic acids with polyvalent alcohols and cellulose esters.

4. The process for making plastic masses which consists in heating yeast with esters of the organic acids with polyvalent alcohols.

5. The process for making plastic masses which consists in heating yeast and esters of the organic acids with glycerin.

6. The process for making plastic masses which consists in heating yeast and esters of the organic acids with polyvalent alcohols under diminished pressure.

7. The process for making plastic masses which consists in heating yeast glycerin and esters of the organic acids with polyvalent alcohols.

In testimony whereof, I have signed my name to this specification in the presence of two subscribing witnesses.

WERNER MOOSER-SCHIESS.

Witnesses:
ERIC ROOSLUIZ,
EMIL FLÜGEL.